United States Patent [19]

Kuroda et al.

[11] 4,451,688

[45] May 29, 1984

[54] PROCESS FOR PREPARING POLYOLEFINS

[75] Inventors: Nobuyuki Kuroda, Yokohama; Toru Nakamura, Kawasaki; Yutaka Shikatani, Yokohama; Kazuo Matsuura, Tokyo; Mituji Miyoshi, Fujisawa, all of Japan

[73] Assignee: Nippon Oil Company, Limited, Tokyo, Japan

[21] Appl. No.: 413,829

[22] Filed: Sep. 1, 1982

[30] Foreign Application Priority Data

Dec. 3, 1981 [JP] Japan .................. 56-193687
Dec. 28, 1981 [JP] Japan .................. 56-209878

[51] Int. Cl.$^3$ ............................ C07C 3/21; C07C 3/10
[52] U.S. Cl. ...................... 585/524; 585/511; 585/512; 526/116; 526/124; 526/125; 526/128; 526/158; 502/133; 502/116; 502/125
[58] Field of Search ................ 585/511, 512, 524; 526/116, 124, 125, 128, 158; 502/133, 134, 116, 125

[56] References Cited

U.S. PATENT DOCUMENTS

| | | | |
|---|---|---|---|
| 4,226,741 | 10/1980 | Luciani et al. | 526/125 |
| 4,315,088 | 2/1982 | Kitagawa et al. | 526/125 |
| 4,324,690 | 4/1982 | Karayannis et al. | 526/124 |
| 4,325,836 | 4/1982 | Epstein et al. | 526/124 |
| 4,347,160 | 8/1982 | Epstein et al. | 526/124 |
| 4,352,915 | 10/1982 | Mashita et al. | 526/158 |
| 4,390,671 | 6/1983 | Imai et al. | 526/125 |

Primary Examiner—Delbert E. Gantz
Assistant Examiner—A. Pal
Attorney, Agent, or Firm—Stevens, Davis, Miller & Mosher

[57] ABSTRACT

Olefins are polymerized in the presence of a catalyst which comprises the combination of:

[I] a solid substance obtained by the reaction of at least the following two components:
  (i) a magnesium compound represented by the general formula $R^1_m(OR^2)_n MgX_{2-m-n}$ wherein $R^1$ and $R^2$ are each a hydrocarbon radical having 1 to 24 carbon atoms, X is a halogen atom, m is $0 \leq m \leq 2$ and n is $0 \leq n \leq 2$, provided $0 \leq m+n \leq 2$, and
  (ii) a titanium compound and/or a vanadium compound;

[II] a silicon compound represented by general formula $R^1_m Si(OR^2)_n X_{4-m-n}$ wherein $R^1$ and $R^2$ are each hydrocarbon radical having 1 to 24 carbon atoms, X is a halogen atom, m is $0 \leq m < 4$ and n is $0 < n \leq 4$, provided 0 m+n 4;

[III] an organometallic compound, where said catalyst comprises a product obtained by pre-reacting said silicon compound (II) and said organometallic compound (III).

9 Claims, No Drawings

PROCESS FOR PREPARING POLYOLEFINS

BACKGROUND OF THE INVENTION

The present invention relates to a process for preparing polyolefins using a novel polymerization catalyst.

Heretofore, in the technical field of this sort there has been known from Japanese Patent Publication No. 12105/1964 a catalyst comprising a magnesium halide and a transition metal compound such as a titanium compound supported thereon. Also, a catalyst obtained by the co-pulverization of a magnesium halide and titanium tetrachloride is known from Belgian Pat. No. 742,112.

However, when viewed from the standpoint that the catalyst activity is desired to be as high as possible in the manufacture of polyolefins, the process disclosed in the Japanese Patent Publication No. 12105/1964 is still unsatisfactory because of a low polymerization activity, while the polymerization activity attained in the process of the Belgian Pat. No. 742,112 is fairly high, but a further improvement is desired.

In the process disclosed in German Pat. No. 2137872, the amount of a magnesium halide used is substantially decreased by the co-pulverization thereof with titanium tetrachloride and alumina, but a remarkable increase in activity per solid, which can be regarded as a guideline for productivity, is not recognized, and it is desired to develop a catalyst of a higher activity.

In the manufacture of polyolefins, moreover, it is also desirable from the aspects of productivity and handling that the bulk density of the resulting polymer be as high as possible. From this standpoint, the process disclosed in the Japanese Patent Publication No. 12105/1964 is not satisfactory in both the bulk density of the resulting polymer and polymerization activity, while in the process disclosed in the Belgian Pat. No. 742,112, the polymerization activity is high, but the bulk density of the resulting polymer is low. Thus, in both the processes, a further improvement is desired.

SUMMARY OF THE INVENTION

According to the present invention there are provided a novel polymerization catalyst and a process for polymerizing olefins using the catalyst, capable of remedying the above-mentioned drawbacks, attaining a high polymerization activity, affording polymers with a high bulk density in high yield and practicing a continuous polymerization extremely easily.

The aforesaid objects of the present invention can be attained by polymerizing at least one olefin in the presence of a catalyst system, which catalyst system comprises the combination of:

[I] a solid substance obtained by the reaction of at least the following two components:
  (i) at least one magnesium compound represented by the general formula $R^1{}_m(OR^2)_n MgX_{2-m-n}$ wherein $R^1$ and $R^2$ are each a hydrocarbon radical having 1 to 24 carbon atoms, X is a halogen atom, m is $0 \leq m \leq 2$ and n is $0 \leq n \leq 2$, provided $0 \leq m+n \leq 2$, and
  (ii) a titanium compound and/or a vanadium compound;

[II] a silicon compound represented by the general formula

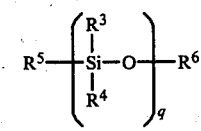

wherein $R^3$, $R^4$ and $R^5$ are each a hydrocarbon radical having 1 to 24 carbon atoms, alkoxy, hydrogen, or halogen, $R^6$ is a hydrocarbon radical having 1 to 24 carbon atoms and q is $1 \leq q \leq 30$; and

[III] an organometallic compound.

Since the polymerization catalyst of the present invention exhibits a very high polymerization activity, the partial pressure of monomer during polymerization is low, and because of a high bulk density of the resulting polymer, the productivity can be improved. Moreover, the amount of the catalyst remaining in the resulting polymer after polymerization is so small that the polyolefin manufacturing process can dispense with the catalyst removing step, which leads to simplification of the polymer treating step, and consequently polyolefins can be prepared very economically.

According to the process of the present invention, the amount of polymer produced per unit polymerization reactor is large because of a high bulk density of the resulting polymer.

The present invention is further advantageous in that when viewed from the standpoint of particle size of the resulting polymer, the proportion of coarse particles and that of fine particles below 50μ are small despite of a high bulk density of the polymer, and that therefore not only it becomes easy to perform a continuous polymerization reaction but also the centrifugal separation in the polymer treating step as well as the handling of polymer particles in powder transport become easy.

According to the present invention, in addition to the high bulk density of polyolefins obtained by using the catalyst of the invention as previously noted, polyolefins having a desired melt index can be prepared at a lower hydrogen concentration than in conventional methods, thus permitting polymerization to be carried out at a relatively small total pressure, and this greatly contributes to the improvement of economy and productivity.

Additionally, in the olefin polymerization using the catalyst of the present invention, the olefin absorbing rate does not decrease so much even with the lapse of time, and therefore the polymerization can be conducted for a long time in a small amount of the catalyst.

Furthermore, polymers prepared by using the catalyst of the present invention have a very narrow molecular weight distribution and their hexane extraction is very small, reflecting minimized by-production of low grade polymers. Therefore, for example, in the film grade, those polymers can afford products of good quality such as a superior anti-blocking property.

The catalyst of the present invention is a novel catalyst having these many characteristic features and remedying the foregoing drawbacks associated with the prior art. It is quite surprising that those features can be attained and the drawbacks remedied by using the catalyst of the present invention.

DETAILED DESCRIPTION OF THE PREFERRED EMBODIMENTS

Examples of the compound of the general formula $R^1_m(OR^2)_n MgX_{2-m-n}$ used in the present invention include magnesium fluoride, magnesium chloride, magnesium bromide, magnesium iodide, diethylmagnesium, diisopropylmagnesium, di-n-butylmagnesium, di-sec-butylmagnesium, methylmagnesium chloride, ethylmagnesium chloride, ethylmagnesium bromide, ethylmagnesium iodide, n-propylmagnesium chloride, n-butylmagnesium chloride, n-butylmagnesium bromide, sec-butylmagnesium chloride, phenylmagnesium chloride, decylmagnesium chloride, methoxymagnesium chloride, ethoxymagnesium chloride, isopropoxymagnesium chloride, n-butoxymagnesium chloride, n-octoxymagnesium chloride, methylmagnesium methoxide, ethylmagnesium methoxide, n-butylmagnesium ethoxide, sec-butylmagnesium ethoxide, decylmagnesium ethoxide, diethoxymagnesium, diisopropoxymagnesium, di-n-butoxymagnesium, di-sec-butoxymagnesium, di-t-butoxymagnesium, and di-n-octoxymagnesium. These compounds may also be used as a complex with trialkylaluminum, such as a complex of di-n-butylmagnesium and triethylaluminum. Magnesium halides, particularly substantially anhydrous magnesium halides, are preferred.

Examples of the titanium compound and/or vanadium compound used in the present invention include halides, alkoxyhalides, alkoxides and halogenated oxides, of titanium and/or vanadium. As preferred examples of the titanium compound, there may be mentioned tetravalent and trivalent titanium compounds. As tetravalent titanium compounds, those represented by the general formula $Ti(OR)_r X_{4-r}$ are preferred wherein R is a hydrocarbon radical such as an alkyl, aryl or aralkyl group having 1 to 24 carbon atoms, X is a halogen atom and r is $0 \leq r \leq 4$, such as titanium tetrachloride, titanium tetrabromide, titanium tetraiodide, monomethoxytrichlorotitanium, dimethoxydichlorotitanium, trimethoxymonochlorotitanium, tetramethoxytitanium, monoethoxytrichlorotitanium, diethoxydichlorotitanium, triethoxymonochlorotitanium, tetraethoxytitanium, monoisopropoxytrichlorotitanium, diisopropoxydichlorotitanium, triisopropoxymonochlorotitanium, tetraisopropoxytitanium, monobutoxytrichlorotitanium, dibutoxydichlorotitanium, monopentoxytrichlorotitanium, monophenoxytrichlorotitanium, diphenoxydichlorotitanium, triphenoxymonochlorotitanium, and tetraphenoxytitanium. As trivalent titanium compounds, there may be used, for example, titanium trihalides obtained by reducing titanium tetrahalides such as titanium tetrachloride and titanium tetrabromide with hydrogen, aluminum, titanium or an organometallic compound of a Group I-III metal in the Periodic Table, as well as trivalent titanium compounds obtained by reducing tetravalent alkoxytitanium halides represented by the general formula $Ti(OR)_s X_{4-s}$ with an organometallic compound of a Group I-III metal in the Periodic Table, in which formula R is a hydrocarbon radical such as an alkyl, aryl or aralkyl group having 1 to 24 carbon atoms, X is a halogen atom and s is $0 < s < 4$. Examples of the vanadium compound include tetravalent vanadium compounds such as vanadium tetrachloride, vanadium tetrabromide, vanadium tetraiodide and tetraethoxyvanadium, pentavalent vanadium compounds such as vanadium oxytrichloride, ethoxydichlorovanadyl, triethoxyvanadyl and tributoxyvanadyl, and trivalent vanadium compounds such as vanadium trichloride and vanadium triethoxide. Tetravalent titanium compounds are most preferable in the present invention.

To make the present invention more effective, the titanium compound and the vanadium compound are often used together. In this case, it is preferable that the V/Ti mole ratio be in the range of 2/1 to 0.01/1.

The method of obtaining the catalyst component [I] in the invention by reacting a compound of the general formula $R^1_m(OR^2)_n MgX_{2-m-n}$ with a titanium compound and/or a vanadium compound is not specially limited. Both may be reacted by contacting usually for 5 minutes to 20 hours under heating at a temperature of 20° to 400° C., preferably 50° to 300° C. in the presence or absence of an inert solvent. Alternatively, the reaction may be carried out by co-pulverization treatment.

The inert solvent which may be used in preparing the catalyst component [I] is not specially limited. Hydrocarbons and/or derivatives thereof not inactivating Ziegler type catalysts are usually employable, for example, various saturated aliphatic hydrocarbons, aromatic hydrocarbons and alicyclic hydrocarbons such as propane, butane, pentane, hexane, heptane, octane, benzene, toluene, xylene and cyclohexane, as well as alcohols, ethers and esters such as ethanol, diethyl ether, tetrahydrofuran, ethyl acetate and ethyl benzoate.

The apparatus to be used for the co-pulverization is not specially limited. Usually, a ball mill, a vibration mill, a rod mill or an impact mill is used. Conditions for the co-pulverization such as temperature and time can be decided easily by those skilled in the art according to the co-pulverization method used. In general, the co-pulverization is carried out at a temperature ranging from 0° to 200° C., preferably 20° to 100° C., for a period of time ranging from 0.5 to 50 hours, preferably 1 to 30 hours. Of course, the co-pulverizing operation should be performed in an inert gas atmosphere, and moisture should be avoided.

The amount of the titanium compound and/or vanadium compound used in the preparation of the catalyst component [I] is, most preferably, adjusted so that it is within the range of 0.5 to 20% by weight in terms of titanium and/or vanadium contained in the catalyst component [I]. The range of 1 to 10% by weight is particularly preferred in order to attain a well-balanced activity per titanium and/or vanadium and that per solid.

In preparing the catalyst component [I] in the present invention, moreover, a member or members selected from the group consisting of organic halides, halogenating agents, phosphoric esters, electron donors and polycyclic aromatic compounds may also preferably be used at the same time as component ($\alpha$). The component ($\alpha$) may be used in an amount of 0.01 to 5 moles, preferably 0.05 to 2 moles, per mole of the magnesium compound.

The organic halides which may be used as component ($\alpha$) are partially halogen-substituted, saturated or unsaturated aliphatic and aromatic hydrocarbons, including mono-, di- and tri-substituted compounds. The halogen may be any of fluorine, chlorine, bromine and iodine.

Examples of such organic halides include methylene chloride, chloroform, carbon tetrachloride, bromochloromethane, dichlorodifluoromethane, 1-bromo-2-chloroethane, chloroethane, 1,2-dibromo-1,1-dichloroethane, 1,1-dichloroethane, 1,2-dichloroethane, 1,2-dichloro-1,1,2,2-tetrafluoroethane, hexachloroethane, pentachloroethane, 1,1,1,2-tetrachloroethane, 1,1,2,2- tetrachloroethane, 1,1,1-trichloroethane, 1,1,2-trichloroethane, 1-chloropropane, 2-chloropropane, 1,2-dichloropropane, 1,3-dichloropropane, 2,2-dichloropropane, 1,1,1,2,2,3,3-heptachloropropane, 1,1,2,2,3,3-hexachloropropane, octachloropropane, 1,1,2-trichloropropane, 1-chlorobutane, 2-chlorobutane, 1-chloro-2-methylpropane, 2-chloro-2-methylpropane, 1,2-dichlorobutane, 1,3-dichlorobutane, 1,4-dichlorobutane, 2,2-dichlorobutane, 1-chloropentane, 1-chlorohexane, 1-chloroheptane, 1-chlorooctane, 1-chlorononane, 1-chlorodecane, vinyl chloride, 1,1-dichloroethylene, 1,2-dichloroethylene, tetrachloroethylene, 3-chloro-1-propene, 1,3-dichloropropene, chloroprene, oleyl chloride, chlorobenzene, chloronaphthalene, benzyl chloride, benzylidene chloride, chloroethylbenzene, styrene dichloride, and α-chlorocumene.

Examples of halogenating agents which may be used in the invention include halides of nonmetals such as sulfur chloride, $PCl_3$, $PCl_5$ and $SiCl_4$, as well as oxyhalides of nonmetals such as $POCl_3$, $COCl_2$, $NOCl_2$, $SOCl_2$ and $SO_2Cl_2$.

Examples of electron donors which may be used in the invention include alcohols, ethers, ketones, aldehydes, organic acids, organic acid esters, acid halides, acid amides, amines and nitriles.

As alcohols there may be used, for example, those having 1 to 18 carbon atoms, such as methyl alcohol, ethyl alcohol, n-propyl alcohol, isopropyl alcohol, allyl alcohol, n-butyl alcohol, isobutyl alcohol, sec-butyl alcohol, t-butyl alcohol, n-amyl alcohol, n-hexyl alcohol, cyclohexyl alcohol, decyl alcohol, lauryl alcohol, myristyl alcohol, cetyl alcohol, stearyl alcohol, oleyl alcohol, benzyl alcohol, naphthyl alcohol, phenol, and cresol.

As ethers there may be used, for example, those having 2 to 20 carbon atoms such as dimethyl ether, diethyl ether, dibutyl ether, isoamyl ether, anisole, phenetole, diphenyl ether, phenylallyl ether, and benzofuran.

As ketones there may be used, for example, those having 3 to 18 carbon atoms such as acetone, methyl ethyl ketone, methyl isobutyl ketone, methyl phenyl ketone, ethyl phenyl ketone, and diphenyl ketone.

As aldehydes there may be used, for example, those having 2 to 15 carbon atoms such as acetaldehyde, propionaldehyde, octylaldehyde, benzaldehyde, and naphthaldehyde.

As organic acids there may be used, for example, those having 1 to 24 carbon atoms such as formic acid, acetic acid, propionic acid, butyric acid, valeric acid, pivalic acid, caproic acid, caprylic acid, stearic acid, oxalic acid, malonic acid, succinic acid, adipic acid, methacrylic acid, benzoic acid, toluic acid, anisic acid, oleic acid, linoleic acid, and linolenic acid.

As organic acid esters there may be used, for example, those having 2 to 30 carbon atoms such as methyl formate, methyl acetate, ethyl acetate, propyl acetate, octyl acetate, ethyl propionate, methyl butyrate, ethyl valerate, methyl methacrylate, methyl benzoate, ethyl benzoate, propyl benzoate, octyl benzoate, phenyl benzoate, benzyl benzoate, ethyl o-methoxybenzoate, ethyl p-ethoxybenzoate, butyl p-ethoxybenzoate, methyl p-toluylate, ethyl p-toluylate, ethyl p-ethylbenzoate, methyl salitylate, phenyl salitylate, methyl naphthoate, ethyl naphthoate, and ethyl anisate.

As acid halides there may be used, for example, those having 2 to 15 carbon atoms such as acetyl chloride, benzyl chloride, toluic acid chloride, and anisic acid chloride.

As acid amides there may be used, for example, acetic amide, benzoic acid amide and toluic acid amide.

As amines there may be used, for example, methylamine, ethylamine, diethylamine, tributylamine, piperidine, tribenzylamine, aniline, pyridine, picoline, and tetramethylenediamine.

As nitriles there may be used, for example, acetonitrile, benzonitrile and tolunitrile.

Phosphoric esters which may be used in the present invention are compounds represented by the general formula

wherein R, which may be alike or different, is a hydrocarbon radical having 1 to 24 carbon atoms. Examples of such compounds include triethyl phosphate, tri-n-butyl phosphate, triphenyl phosphate, tribenzyl phosphate, trioctyl phosphate, tricresyl phosphate, tritolyl phosphate, trixylyl phosphate, and diphenylxylenyl phosphate.

Examples of polycyclic aromatic compounds which may be used in the present invention include naphthalene, phenanthrene, triphenylene, chrysene, 3,4-benzophenanthrene, 1,2-benzochrysene, picene, anthracene, tetraphene, 1,2,3,4-dibenzanthracene, pentaphene, 3,4-benzopentaphene, tethracene, 1,2-benzotethracene, hexaphene, heptaphene, diphenyl, fluorene, biphenylene, perylene, coronene, bisantene, ovalene, pyrene, and perinaphthene, as well as halogen- and alkyl-substituted derivatives thereof.

The catalyst component [I] thus obtained may be supported on an oxide of a Group II-IV metal in the Periodic Table. This is also preferable in the present invention. In this case, not only oxides of Group II-IV metals each alone but also double oxides these metals, as well as mixtures thereof, are employable. Examples of such metal oxides include MgO, CaO, ZnO, BaO, $SiO_2$, SnO, $Al_2O_3$, $MgO.Al_2O_3$, $SiO_2.Al_2O_3$, $MgO.SiO_2$, $MgO.CaO.Al_2O_3$, and $Al_2O_3.CaO$. Particularly preferred are $SiO_2$, $Al_2O_3$, $SiO_2.Al_2O_3$ and $MgO.Al_2O_3$.

The method of supporting the catalyst component [I] on an oxide of a Group II-IV metal in the Periodic Table is not specially limited, but as a preferred example there may be mentioned a method wherein the components (i) and (ii) and if required the component (α) are fed in the presence of such metal oxide and an ether compound as solvent and allowed to react under heating, then the liquid phase portion is removed.

Examples of the silicon compound of the general formula

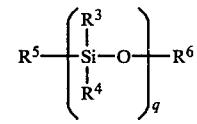

used in the present invention include monomethyl trimethoxy silane, monomethyl triethoxy silane, monomethyl tri-n-butoxy silane, monomethyl tri-sec-butoxy silane, monomethyl triisopropoxy silane, monomethyl tripentoxy silane, monomethyl trioctoxy silane, monomethyl tristearoxy silane, monomethyl triphenoxy silane, dimethyl dimethoxy silane, dimethyl diethoxy silane, dimethyl diisopropoxy silane, dimethyl diphenoxy silane, trimethyl monomethoxy silane, trimethyl monoethoxy silane, trimethyl monoisopropoxy silane, trimethyl monophenoxy silane, monomethyl dimethoxy monochlorosilane, monomethyl diethoxy monochlorosilane, monomethyl diethoxy monochlorosilane, monomethyl diethoxy monobromosilane, monomethyldiphenoxy monochlorosilane, dimethyl monoethoxy monochlorosilane, monoethyl trimethoxy silane, monoethyl triethoxy silane, monoethyl triisopropoxy silane, monoethyl triphenoxy silane, diethyl dimethoxy silane, diethyl diethoxy silane, diethyl diphenoxy silane, triethyl monomethoxy silane, triethyl monoethoxy silane, triethyl monophenoxy silane, monoethyl dimethoxy monochlorosilane, monoethyl diethoxy monochlorosilane, monoethyl diphenoxy monochlorosilane, monoisopropyl trimethoxy silane, mono-n-butoxy trichlorosilane, monomethoxy trichlorosilane, monoocotoxy trichlorosilane, monostearoxy trichlorosilane, monophenoxy trichlorosilane, mono-p-methyl phenoxy trichlorisilane, dimethoxy dichlorosilane, diethoxy dichlorosilane, diisopropoxy dichlorosilane, di-n-butoxy dichlorosilane, dioctoxy dichlorosilane, trimethoxy monochlorosilane, triethoxy monochlorosilane, triisopropoxy monochlorosilane, tri-n-butoxy monochlorosilane, tri-sec-butoxy monochlorosilane, tetraethoxy silane, tetraisopropoxy silane, as well as chain or cyclic polysiloxanes having a recurring unit represented by the formula

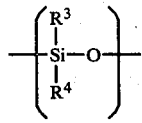

obtained by condensation of the compounds exemplified above. Particularly, silicon compounds of the foregoing general formula wherein q=1 are preferred. More preferable silicon compounds are those represented by the general formula $R'_mSi(OR'')_nX_{4-m-n}$ wherein R' and R'' are each a hydrocarbon radical having 1 to 24 carbon atoms, X is a halogen atom, m is $0 \leq m < 4$ and n is $0 < n \leq 4$, provided $0 < m+n \leq 4$.

If the amount of the compound of the general formula

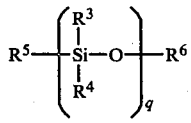

used in the present invention is too large or too small, its effect of addition cannot be expected. Usually, its amount ranges from 0.1 to 100 moles, preferably 0.3 to 20 moles, per mole of the titanium compound and/or vanadium compound in the catalyst component [I].

As examples of the organometallic compound used in the present invention, there may be mentioned organometallic compounds of Group I-IV metals in the Periodic Table known as a component of Ziegler type catalysts, but organoaluminum compounds and organozinc compounds are particularly preferred, for example, organoaluminum compounds of the general formulae $R_3Al$, $R_2AlX$, $RAlX_2$, $R_2AlOR$, $RAl(OR)X$ and $R_3Al_2X_3$ wherein R, which may be alike or different, is an alkyl or aryl group having 1 to 20 carbon atoms and X is a halogen atom, and organozinc compounds of the general formula $R_2Zn$ wherein R, which may be alike or different, is an alkyl group having 1 to 20 carbon atoms, such as triethylaluminum, triisopropylaluminum, triisobutylaluminum, tri-sec-butylaluminum, tri-tert-butylaluminum, trihexylaluminum, trioctylaluminum, diethylaluminum chloride, diisopropylaluminum chloride, ethylaluminum sesquichloride, diethylzinc, and mixtures thereof. Together with these organometallic compounds there may be used organocarboxylic acid esters such as ethyl benzoate, ethyl o- or p-toluylate and ethyl p-anisate. The amount of the organometallic compound is not specially limited, but usually it ranges from 0.1 to 1,000 moles per mole of the titanium compound and/or vanadium compound.

In the present invention, moreover, the silicon compound of the general formula

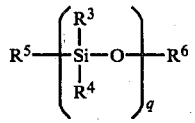

may be reacted with the organometallic compound in advance and the reaction product is combined with the solid substance [I]. In this case, the reaction ratio is such that the molar ratio of the silicon compound to the organometallic compound is in the range of 1:500 to 1:1, preferably 1:100 to 1:2. The amount of the reaction product to be used is preferably in the range of 0.1:1 to 100:1 and more preferably 0.3:1 to 20:1 in terms of Si:Ti and/or V mole ratio with respect to the titanium compound and/or vanadium compound in the catalyst component [I].

The olefin polymerization using the catalyst of the present invention may be carried out by slurry polymerization, solution polymerization or vapor phase polymerization. Particularly, vapor phase polymerization is preferred. The polymerization reaction is carried out in the same way as in the conventional olefin polymerization reaction using a Ziegler type catalyst. That is, the reaction is performed in a substantially oxygen- and water-free condition and in the presence or absnece of an inert hydrocarbon. Olefin polymerizing conditions involve temperatures ranging from 20° to 120° C., preferably 50° to 100° C., and pressures ranging from atmospheric pressure to 70 kg/cm², preferably 2 to 60 kg/cm². Adjustment of the molecular weight can be made to some extent by changing polymerization conditions such as polymerization temperature and catalyst mole ratio, but the addition of hydrogen into the polymerization system is more effective for this purpose. Of course, using the catalyst of the present invention, two or more multi-stage polymerization reactions having different polymerization conditions such as different hydrogen concentrations and different polymerization temperatures can be performed without any trouble.

The process of the present invention is applicable to the polymerization of all olefins that are polymerizable with a Ziegler type catalyst. Particularly, α-olefins having 2 to 12 carbon atoms are preferred. For example, the process of the present invention is suitable for application to the homopolymerization of such α-olefins as ethylene, propylene, 1-butene, hexene-1, 4-methylpentene-1 and octene-1, the copolymerization of ethylene/propylene, ethylene/1-butene, ethylene/hexene-1, ethylene/4-methylpentene-1, ethylene/octene-1 and propylene/1-butene, as well as the copolymerization of ethylene and other two or more α-olefins.

Copolymerization with dienes for the purpose of modification of polyolefins may also be conducted preferably. As dienes there may be used, for example, butadiene, 1,4-hexadiene, ethylidene norbornene and dicyclopentadiene.

The following examples are given to further illustrate the present invention, but it is to be understood that the invention is not limited thereto.

EXAMPLE 1

(a) Preparation of a Solid Catalyst Component [I]

200 ml. of ethanol, 20 g. of ethoxymagnesium chloride (Mg/Cl mol ratio=0.81) obtained by treating magnesium diethoxide with HCl, 10 g. of triethyl phosphate and 20 g. of tetraethoxy silane were placed in a three-necked 500 cc. flask equipped with an induction stirrer, and allowed to react for 3 hours under reflux of ethanol. Thereafter, the supernatant liquid was removed and the reaction product was washed with three 200 ml. portions of hexane. Then 200 ml. of hexane and 5 ml. of titanium tetrachloride were added and allowed to react for 2 hours under reflux of hexane. Then, after removing the supernatant liquid, the reaction product was washed with hexane five times to obtain a solid catalyst component containing 21 mg. of titanium per gram thereof.

(b) Polymerization

A stainless steel autoclave was used as an apparatus for vapor phase polymerization, and a loop was formed with a blower, a flow control device and a dry cyclone. The temperature of the autoclave was adjusted by passing a warm water through a jacket.

Into the autoclave held at 80° C. were fed the solid catalyst component [I] prepared above and triethylaluminum at the rates of 50 mg/hr and 5 mmol/hr, respectively. Further, butene-1, ethylene and hydrogen gases were fed while adjusting the butene-1/ethylene mol ratio in the vapor phase in the autoclave to 0.27 and the hydrogen concentration to 15% of the total pressure, and polymerization was allowed to take place while recycling the intra-system gases by the blower to maintain the total pressure at 10 kg/cm$^2$·G, to afford an ethylene copolymer having a bulk density of 0.29, a melt index (MI) of 1.1 and a density of 0.9208. The catalyst activity was 238,000 g.copolymer/g.Ti.

After a continuous operation for 10 hours, the autoclave was opened and its interior was checked. As a result, the interior of the autoclave proved to be clean with no polymer adhered to the inner wall and the stirrer.

The F.R. value (F.R.=MI$_{10}$/MI$_{2.16}$) represented in terms of the ratio of a melt index MI$_{10}$ of the copolymer determined at a load of 10 kg. to a melt index thereof MI$_{2.16}$ determined at a load of 2.16 kg. both at 190° C. according to the method defined by ASTM-D1236-65T, was 7.3 and thus the molecular weight distribution was very narrow.

When a film formed from this copolymer was extracted in boiling hexane for 10 hours, its hexane extraction proved to be 1.5 wt.% and thus very small.

COMPARATIVE EXAMPLE 1

A solid catalyst component was prepared in the same way as in Example 1 except that tetraethoxy silane was not used. It contained 22 mg. of titanium per gram thereof.

A continuous polymerization of ethylene and butene-1 was carried out in the same manner as in Example 1 except that the solid catalyst component just prepared above was fed at the rate of 50 mg/hr, to afford an ethylene copolymer having a bulk density of 0.23, a density of 0.9203 and a melt index of 1.4. The catalyst activity was 164,000 g.copolymer/g.Ti.

The F.R. value of the copolymer was 8.1, and when a film formed from the copolymer was extracted in boiling hexane for 10 hours, its hexane extraction proved to be 4.4 wt.%.

EXAMPLE 2

200 ml. of hexane, 30 g. of ethoxymagnesium chloride (Mg/Cl mol ratio=0.81) obtained by treating magnesium diethoxide with HCl and 18 g. of t-butyl chloride were placed in a three-necked 500 cc. flask equipped with a stirrer and allowed to react for 2 hours under reflux of hexane, then 10 g. of titanium tetrachloride was added and reaction was further allowed to proceed for 2 hours. Thereafter, the supernatant liquid was removed and the reaction product was washed with three 200 ml. portions of hexane. Then, 200 ml. of hexane and 20 g. of tetraethoxy silane were added and reacted for 2 hours under reflux of hexane. Then, after removing the supernatant liquid, the reaction product was washed with hexane five times to give a solid catalyst component containing 18 mg. of titanium per gram thereof.

A continuous vapor phase polymerization of ethylene and butene-1 was carried out in the same way as in Example 1 except that the solid catalyst component just prepared above was fed at the rate of 50 mg/hr, to afford an ethylene copolymer having a bulk density of 0.34, a density of 0.9211 and a melt index of 1.2. The catalyst activity was 294,000 g.copolymer/g.Ti and thus was very high.

After a continuous operation for 10 hours, the autoclave was opened and its interior was checked. As a result, the interior of the autoclave was clean with no polymer adhered to the inner wall and the stirrer.

The F.R. value of the copolymer was 7.2, and when a film formed form the copolymer was extracted in boiling hexane, its extraction proved to be 1.4 wt.% and thus very small.

EXAMPLE 3

200 ml. of n-hexane, 20 g. of n-butylmagnesium chloride, 7.5 g. of ethyl benzoate and 20 g. of triethoxy monochlorosilane were placed in a three-necked 500 cc. flask equipped with a stirrer and allowed to react for 3 hours under reflux of hexane. Thereafter, the supernatant liquid was removed and the reaction product was dried up to obtain a white solid substance.

Then, 10 g. of the above solid substance and 1.2 g. of titanium tetrachloride were placed in a stainless steel pot having a content volume of 400 ml. and containing 25 stainless steel balls each ½ inch in diameter, and ball-milled for 16 hours at room temperature in a nitrogen atmosphere, to give a solid catalyst component containing 27 mg. of titanium per gram thereof.

A continuous vapor phase polymerization of ethylene and butene-1 was carried out in the same manner as in Example 1 except that the solid catalyst component just prepared above was fed at the rate of 50 mg/hr, to afford an ethylene copolymer having a bulk density of 0.36, a density of 0.9198 and a melt index of 0.9. The catalyst activity was 239,000 g.copolymer/g.Ti and thus was very high.

After a continuous operation for 10 hours, the autoclave was opened and its interior was checked. As a result, the interior of the autoclave proved to be clean with no polymer adhered to the inner wall and the stirrer.

The F.R. value of the copolymer was 7.4, and when a film formed from the copolymer was extracted in boiling hexane, its hexane extraction proved to be 1.6 wt.% and thus very small.

EXAMPLE 4

A stainless steel 2 liter autoclave equipped with an induction stirrer was purged with nitrogen and charged with 1,000 ml. of hexane, then 1 mmol of triethylaluminum and 20 mg. of the solid powder obtained in Example 1 were added, and the temperature was raised to 90° C. under stirring. The system was pressurized to 2 kg/cm$^2$·G by the vapor pressure of hexane, then hydrogen was introduced to a total pressure of 4.8 kg/cm$^2$·G, and thereafter ethylene was introduced to maintain the total pressure at 10 kg/cm$^2$·G, under which condition polymerization was carried out for 1 hour. Thereafter, the polymer slurry was transferred into a beaker and hexane removed under reduced pressure to yield 175 g. of a white polymer having a melt index of 1.2 and a bulk density of 0.32. The catalyst activity was 80,100 g.polyethylene/g.Ti·hr·C$_2$H$_4$ pressure, 1,680 g.polyethylene/g.solid·hr·C$_2$H$_4$ pressure.

The F.R. value of the polyethylene was 8.1, indicating a very narrow molecular weight distribution, and its hexane extraction proved to be 0.17 wt.%.

EXAMPLE 5

(a) Preparation of a Solid Catalyst Component [I]

10 g. of a commercially available anhydrous magnesium chloride, 1 g. of 1,2-dichloroethane and 2.5 g. of titanium tetrachloride were placed in a stainless steel pot having a content volume of 400 ml. and containing 25 stainless steel balls each ½ inch in diameter, and ball-milled for 16 hours at room temperature in a nitrogen atmosphere, to obtain a solid catalyst component [I] containing 44 mg. of titanium per gram thereof.

(b) Polymerization

A stainless steel autoclave was used as an apparatus for vapor phase polymerization, and a loop was formed with a blower, a flow control device and a dry cyclone. The temperature of the autoclave was adjusted by passing a warm water through a jacket.

Into the autoclave held at 80° C. were fed the solid catalyst component [I] prepared above, monomethyl triethoxy silane and triethylaluminum at the rates of 50 mg/hr, 0.22 mmol/hr and 5 mmol/hr, respectively. Further, butene-1, ethylene and hydrogen gases were fed while adjusting the butene-1/ethylene mol ratio in the vapor phase in the autoclave to 0.27 and the hydrogen concentration to 15% of the total pressure, and polymerization was allowed to take place while recycling the intra-system gases by the blower to maintain the total pressure at 10 kg/cm$^2$·G, to give an ethylene copolymer having a bulk density of 0.35, a melt index (MI) of 1.0 and a density of 0.9211. The catalyst activity was 526,000 g.copolymer/g.Ti.

After a continuous operation for 10 hours, the autoclave was opened and its interior was checked. As a result, the interior of the autoclave proved to be clean with no polymer adhered to the inner wall and the stirrer.

The F.R. value was 7.2 and thus the molecular weight distribution was very narrow.

When a film formed from this copolymer was extracted in boiling hexane for 10 hours, its hexane extraction proved to be 1.4 wt.% and thus very small.

COMPARATIVE EXAMPLE 2

A continuous vapor phase polymerization of ethylene and butene-1 was carried out in the same way as in Example 5 except that monomethyl triethoxy silane was not added, to afford an ethylene copolymer having a bulk density of 0.31, a density of 0.9195 and a melt index of 1.0. The catalyst activity was 498,000 g.copolymer/g.Ti.

After a continuous operation for 10 hours, the autoclave was opened and its interior was checked. As a result, a small amount of polymer proved to adhere to the inner wall and the stirrer.

The F.R. value of the copolymer was 8.9, and when a film formed from the copolymer was extracted in boiling hexane for 10 hours, its hexane extraction proved to be 5.3 wt.%.

EXAMPLE 6

100 ml. of ethanol, 20 g. of anhydrous magnesium chloride and 5 g. of phosphorus oxychloride were charged into a three-necked 300 cc. flask equipped with a magnetic induction stirrer, and allowed to react for 3 hours under reflux. Thereafter, 150 ml. of n-hexane was added to allow precipitation to take place, and after standing, the supernatant liquid was removed, followed by vacuum drying at 200° C. to give a white dry powder.

11 g. of the above white powder and 2.3 g. of titanium tetrachloride were placed in a stainless steel pot having a content volume of 400 ml. and containing 25 stainless steel balls each ½ inch in diameter, and ball-milled for 16 hours at room temperature in a nitrogen atmosphere, to give a solid catalyst component [I] containing 42 mg. of titanium per gram thereof.

A continuous vapor phase polymerization of ethylene and butene-1 was carried out in the same way as in Example 5 except that the solid catalyst component [I] just prepared above was fed at the rate of 50 mg/hr, to afford an ethylene copolymer having a bulk density of 0.37, a density of 0.9211 and a melt index of 1.3. The catalyst activity was 584,000 g.copolymer/g.Ti and thus was very high.

After a continuous operation for 10 hours, the autoclave was opened and its interior was checked. As a result, the interior of the autoclave proved to be clean with no polymer adhered to the inner wall and the stirrer.

The F.R. value of the copolymer was 7.3, and when a film formed from the copolymer was extracted in boiling hexane for 10 hours, its hexane extraction proved to be 1.5 wt.% and thus very small.

EXAMPLE 7

10 g. of anhydrous magnesium chloride, 3.5 g. of anthracene and 2.1 g. of titanium tetrachloride were placed in the ball mill pot described in Example 5 and ball-milled for 16 hours at room temperature in a nitrogen atmosphere, to obtain a solid catalyst component [I] containing 34 mg. of titanium per gram thereof.

A continuous vapor phase polymerization of ethylene and butene-1 was conducted in the same manner as in Example 5 except that the solid catalyst component [I] just prepared above was fed at the rate of 50 mg/hr and tetraethoxy silane in place of monomethyl triethoxy silane was fed at the rate of 0.25 mmol/hr, to afford an ethylene copolymer having a bulk density of 0.33, a density of 0.9211 and a melt index of 1.1. The catalyst activity was 481,000 g.copolymer/g.Ti and thus was very high.

After a continuous operation for 10 hours, the autoclave was opened and its interior was checked. As a result, the interior of the autoclave proved to be clean with no polymer adhered to the inner wall and the stirrer.

The F.R. value of the copolymer was 7.4, and when a film formed from the copolymer was extracted in boiling hexane for 10 hours, its hexane extraction proved to be 1.5 wt.% and thus very small.

EXAMPLE 8

10 g. of anhydrous magnesium chloride, 2.5 g. of isoamyl ether and 2.1 g. of titanium tetrachloride were placed in the ball mill pot described in Example 5 and ball-milled for 16 hours at room temperature in a nitrogen atmosphere, to obtain a solid catalyst component [I] containing 36 mg. of titanium per gram thereof.

A continuous vapor phase polymerization of ethylene and butene-1 was conducted in the same manner as in Example 5 except that the solid catalyst component [I] just prepared above was fed at the rate of 50 mg/hr and monophenyl triethoxy silane in place of monomethyl triethoxy silane waas fed at the rate of 0.25 mmol/hr, to afford an ethylene copolymer having a bulk density of 0.35, a density of 0.9201 and a melt index of 0.91. The catalyst activity was 354,000 g.copolymer/g.Ti and thus very high.

After a continuous operation for 10 hours, the autoclave was opened and its interior was checked. As a result, the interior of the autoclave proved to be clean with no polymer adhered to the inner wall and the stirrer.

The F.R. value of the copolymer was 7.3., and when a film formed from the copolymer was extracted in boiling hexane for 10 hours, its hexane extraction proved to be 1.4 wt.% and thus very small.

EXAMPLE 9

10 g. of anhydrous magnesium chloride, 3.3 g. of triethyl phosphate and 2.0 g. of diisopropoxydichlorotitanium were placed in the ball mill pot described in Example 5 and ball-milled for 16 hours at room temperature in a nitrogen atmosphere to obtain a solid catalyst component [I] containing 31 mg. of titanium per gram thereof.

A continuous vapor phase polymerization of ethylene and butene-1 was conducted in the same manner as in Example 5 except that the solid catalyst component [I] just prepared above was fed at the rate of 50 mg/hr and tetraethoxy silane in place of monomethyl ethoxy silane was fed at the rate of 0.25 mmol/hr, to afford an ethylene copolymer having a bulk density of 0.37, a density of 0.9207 and a melt index of 1.2. The catalyst activity was 418,000 g.copolymer/g.Ti and thus very high.

After a continuous operation for 10 hours, the autoclave was opened and its interior was checked. As a result, the interior of the autoclave proved to be clean with no polymer adhered to the inner wall and the stirrer.

The F.R. value of the copolymer was 7.2, and when a film formed from the copolymer was extracted in boiling hexane for 10 hours, its hexane extraction proved to be 1.4 wt.% and thus very small.

EXAMPLE 10

A stainless steel 2 liter autoclave equipped with an induction stirrer was purged with nitrogen and charged with 1,000 ml. of hexane, then 1 mmol of triethylaluminum, 0.05 mmol of tetraethoxy silane and 10 mg. of the solid catalyst component [I] obtained in Example 5 were added and the temperature was raised to 90° C. under stirring. The system was pressurized to 2 kg/cm$^2$·G by the vapor pressure of hexane, then hydrogen was introduced to a total pressure of 4.8 kg/cm$^2$·G, and thereafter ethylene was introduced to a total pressure of 10 kg/cm$^2$·G to initiate polymerization. The polymerization was carried out for 1 hour while maintaining the pressure in the autoclave at 10 kg/cm$^2$·G. Thereafter, the polymer slurry was transferred into a beaker and hexane removed under reduced pressure to yield 146 g. of a white polyethylene having a melt index of 0.9, a density of 0.9629 and a bulk density of 0.35. The catalyst activity was 70,000 g.polyethylene/g.Ti·hr·C$_2$H$_4$ pressure, 2,800 g.polyethylene/g.solid·hr·C$_2$H$_4$ pressure.

The F.R. value of the polyethylene was 7.9 and thus the molecular weight distribution was very narrow as compared with Comparative Example 3, and its hexane extraction proved to be 0.35 wt.%.

COMPARATIVE EXAMPLE 3

Polymerization was conducted for 1 hour in the same manner as in Example 10 except that tetraethoxy silane was not used, to yield 145 g. of a white polyethylene having a melt index of 1.5, a density of 0.9638 and a bulk density of 0.29. The catalyst activity was 69,800 g.polyethylene/g.Ti·hr·C$_2$H$_4$ pressure, 2,790 g.polyethylene/g.solid·hr·C$_2$H$_4$ pressure.

The F.R. value of the polyethylene was 9.5 and its hexane extraction proved to be 1.8 wt.%.

EXAMPLE 11

The solid catalyst component [I] obtained in Example 5 was fed at the rate of 50 mg/hr, and a product obtained by the reaction of triethylaluminum and monomethyl triethoxy silane at the composition (mol ratio) of 5:0.22 for 2 hours at room temperature was fed at the rate of 5 mmol/hr in terms of aluminum, under which conditions a continuous vapor phase polymerization was carried out following the procedure of Example 5, to afford an ethylene copolymer having a bulk density of 0.34, a density of 0.9200 and a melt index of 1.1. The catalyst activity was 473,000 g.copolymer/g.Ti and thus very high.

After a continuous operation for 10 hours, the autoclave was opened and its interior was checked. As a result, the interior of the autoclave was clean with no polymer adhered to the inner wall and the stirrer.

The F.R. value of the copolymer was 7.4, and when a film formed from the copolymer was extracted in boiling hexane for 10 hours, its hexane extraction proved to be 1.5 wt.% and thus very small.

What is claimed is:

1. A process for preparing a polyolefin, characterized by polymerizing at least one olefin in the presence of a catalyst, said catalyst comprising the combination of:
   [I] a solid substance obtained by the reaction of at least the following two components:
   (i) at least one magnesium compound represented by the general formula $R^1{}_m(OR^2)_n MgX_{2-m-n}$ wherein $R^1$ and $R^2$ are each a hydrocarbon radical having 1 to 24 carbon atoms, X is a halogen atom, m is $0 \leq m \leq 2$ and n is $0 \leq n \leq 2$, provided $0 \leq m+n \leq 2$, and
   (ii) a titanium compound and/or a vanadium compound;
   [II] a silicon compound represented by general formula $R'_m Si(OR'')_n X_{4-m-n}$ wherein R' and R'' are each hydrocarbon radical having 1 to 24 carbon atoms, X is a halogen atom, m is $0 \leq m < 4$ and n is $0 < n \leq 4$, provided $0 < m+n \leq 4$; and
   [III] an organometallic compound, wherein said catalyst comprises a product obtained by pre-reacting said silicon compound [II] and said organometallic compound [III].

2. The process of claim 1, wherein said magnesium compound is a magnesium halide.

3. The process of claim 1, wherein said solid substance [I] is prepared in the presence of at least one member selected from the group consisting of organic halides, halogenating agents, phosphoric esters, electron donors and polycyclic aromatic compounds.

4. The process of claim 1, wherein said solid substance [I] is supported on an oxide of a Group II-IV metal in the Periodic Table.

5. The process of claim 1, wherein the titanium and-/or vanadium content in said solid substance [I] is in the range of 0.5 to 20 weight percent.

6. The process of claim 1, wherein the amount of said silicon compound [II] is in the range of 0.1 to 100 moles per mole of the titanium compound and/or the vanadium compound in said solid substance [I].

7. The process of claim 1, wherein said organometallic compound [III] is an organoaluminum compound or an organozinc compound.

8. The process of claim 1, wherein said olefin is an α-olefin having 2 to 12 carbon atoms.

9. The process of claim 1, wherein the polymerization reaction is carried out at a temperature in the range of 20° to 120° C. and at a pressure in the range of atmospheric pressure to 70 kg/cm².

* * * * *